(12) United States Patent
Liu

(10) Patent No.: US 12,598,446 B2
(45) Date of Patent: Apr. 7, 2026

(54) SERVICE MAINTAINING METHOD IN SIDELINK RELAY SYSTEM AND RELAY DEVICE, AND MEDIUM

(71) Applicant: SPREADTRUM COMMUNICATIONS (SHANGHAI) CO., LTD., Shanghai (CN)

(72) Inventor: Xing Liu, Pudong New Area (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 413 days.

(21) Appl. No.: 18/033,953

(22) PCT Filed: Oct. 22, 2021

(86) PCT No.: PCT/CN2021/125585
§ 371 (c)(1),
(2) Date: Apr. 26, 2023

(87) PCT Pub. No.: WO2022/089312
PCT Pub. Date: May 5, 2022

(65) Prior Publication Data
US 2023/0396964 A1 Dec. 7, 2023

(30) Foreign Application Priority Data
Oct. 28, 2020 (CN) .......................... 202011174054.1

(51) Int. Cl.
| | |
|---|---|
| *H04W 4/06* | (2009.01) |
| *H04W 40/22* | (2009.01) |
| *H04W 72/40* | (2023.01) |

(52) U.S. Cl.
CPC ............. *H04W 4/06* (2013.01); *H04W 40/22* (2013.01); *H04W 72/40* (2023.01)

(58) Field of Classification Search
CPC ........ H04W 4/06; H04W 72/40; H04W 40/22
See application file for complete search history.

(56) References Cited

U.S. PATENT DOCUMENTS

| | | | |
|---|---|---|---|
| 2013/0051306 A1* | 2/2013 | Gou ...................... | H04W 72/30 |
| | | | 370/312 |
| 2017/0201964 A1* | 7/2017 | Gupta ............... | H04W 72/0446 |

(Continued)

FOREIGN PATENT DOCUMENTS

| | | |
|---|---|---|
| CN | 107135486 A | 9/2017 |
| CN | 108476493 A | 8/2018 |

(Continued)

OTHER PUBLICATIONS

Apple, "Discussion on remaining issues on NR Sidelink Relay discovery", 3GPP TSG-RAN WG2 Meeting #112e, R2-2009524, Nov. 2-13, 2020, 3 pages.

(Continued)

*Primary Examiner* — Won Tae C Kim
(74) *Attorney, Agent, or Firm* — CANTOR COLBURN LLP

(57) ABSTRACT

A service maintaining method in a sidelink relay system, a relay device, and a medium are provided. The method includes: receiving feedback on a transmitted data packet from at least one UE in response to being configured to forward multicast services; and determining to stop forwarding a current MBMS service or continue to forward the current MBMS service based on the feedback on the transmitted data packet from the at least one UE.

9 Claims, 2 Drawing Sheets a relay device receives feedback on a transmitted data packet from at least one UE in response to being configured to forward multicast services ⎯ S301 the relay device determines to stop forwarding a current MBMS service or continue to forward the current MBMS service based on the feedback on the transmitted data packet from the at least one UE ⎯ S302

(56) References Cited

U.S. PATENT DOCUMENTS

| | | | | |
|---|---|---|---|---|
| 2019/0020381 | A1 | 1/2019 | Tooher et al. | |
| 2020/0044880 | A1* | 2/2020 | Sankaran | H04L 43/0829 |
| 2021/0037534 | A1 | 2/2021 | Ji | |
| 2021/0321386 | A1 | 10/2021 | Feng et al. | |
| 2022/0408450 | A1* | 12/2022 | Fu | H04W 40/22 |

FOREIGN PATENT DOCUMENTS

| | | |
|---|---|---|
| CN | 110380828 A | 10/2019 |
| CN | 111147188 A | 5/2020 |
| CN | 111756495 A | 10/2020 |
| WO | 2020068973 A1 | 4/2020 |
| WO | 2020146580 A1 | 7/2020 |

OTHER PUBLICATIONS

Ericsson, "On the Support of HARQ/CSI feedbacks Over Sidelink", 3GPP TSG-RAN WG2 #104, TDoc R2-1817957, Nov. 12-16, 2018, 4 pages.

International Search Report for corresponding International Application No. PCT/CN2021/125585; Mailing Date, Jan. 26, 2022.

ZTE, "Sidelink Feedback of FeD2D Relay", 3GPP TSG RAN WG1 Meeting #90, R1-1712921, Aug. 21-25, 2017, 6 pages.

Catt, "New Resource (Re-) Selection Triggers"; 3GPP TSG RAN WG2#109-e; R2-2000207; Electronic Meeting, Feb. 24-Mar. 6, 2020; 3 pages.

EPO Extended European Search Report for corresponding EP Application No. 21885039.4; Issued Mar. 19, 2024; 7 pages.

SIPO First Office Action for corresponding CN Application No. 202011174054.1; issued Mar. 13, 2024; 12 pages.

* cited by examiner

SERVICE MAINTAINING METHOD IN SIDELINK RELAY SYSTEM AND RELAY DEVICE, AND MEDIUM

CROSS-REFERENCE TO RELATED APPLICATIONS

This is the U.S. national stage of application No. PCT/CN2021/125585, filed on Oct. 21, 2021. Priority under 35 U.S.C. § 119(a) and 35 U.S.C. § 365(b) is claimed from Chinese Application No. 202011174054.1, filed Oct. 28, 2020, the disclosure of which is also incorporated herein by reference.

TECHNICAL FIELD

The present disclosure generally relates to radio communication technology field, and more particularly, to a service maintaining method in a sidelink relay system, a relay device, and a medium.

BACKGROUND

Sidelink communication technology is different from traditional wireless cellular network communication. In a traditional cellular network, a User Equipment (UE) communicates with a base station, where a link between the UE and the base station is called an Uplink (UL) or a Downlink (DL), and an interface is called Uu interface. However, in the sidelink communication, a UE directly communicates with another UE, where a link between the UEs is called a Sidelink (SL), and an interface is called PC5 interface.

Initially, sidelink was introduced to realize direct communication between UEs with a short distance, where data does not need to be forwarded by the base station to reduce a transmission delay. On the basis of sidelink, a sidelink relay is designed, where sidelink technique is applied to a link between the relay and the UE, while uplink and downlink technology is adopted between a traditional relay and the UE.

Referring to FIG. 1, FIG. 1 is a structural diagram of a traditional relay in existing techniques. A base station and a relay device communicate through uplink and downlink, and the relay device and a UE communicate through uplink and downlink. Referring to FIG. 2, FIG. 2 is a structural diagram of a sidelink relay in the existing techniques. Different from FIG. 1, in FIG. 2, the relay device and the UE communicate through sidelink.

The relay is capable of forwarding unicast data and multicast data, and a target receiving UE of the multicast data is a UE interested in a particular multicast service, and the multicast service may be a TV service. In 3GPP Rel-13, if the relay device determines that no UE is interested in a particular multicast service, the relay device may stop forwarding the multicast service.

In 3GPP Rel-13, forwarding of the Multimedia Broadcast/Multicast Service (MBMS) in a relay scenario is realized by periodically re-requesting the MBMS service by the UE.

SUMMARY

Embodiments of the present disclosure may avoid a waste of radio resources in forwarding of MBMS service in a relay scenario.

In an embodiment of the present disclosure, a service maintaining method in a sidelink relay system is provided, including receiving feedback on a transmitted data packet from at least one UE in response to being configured to forward multicast services; and determining to stop forwarding a current MBMS service or continue to forward the current MBMS service based on the feedback on the transmitted data packet from the at least one UE.

In an embodiment of the present disclosure, a non-volatile or non-transitory computer-readable storage medium having computer instructions stored therein is provided, wherein when the computer instructions are executed by a processor, any one of the above methods is performed.

In an embodiment of the present disclosure, a relay device including a memory and a processor is provided, wherein the memory has computer instructions stored therein, and when the processor executes the computer instructions, any one of the above methods is performed.

DETAILED DESCRIPTION

In 3GPP Rel-13, when a UE is interested in an MBMS service, a following process may be used to request a relay device to forward the MBMS service. First, the UE transmits a request message of TMGI_MONITORING_REQUEST which contains at least identity information of the MBMS service. The relay device feeds back a message of TMGI_MONITORING_RESPONSE information accordingly which carries a group ID. The UE receives the MBMS service by monitoring the group ID.

When transmitting the message of TMGI_MONITORING_RESPONSE, the relay device starts or restarts a T4105 timer. After the T4105 timer expires, the relay device stops forwarding the MBMS service.

When receiving the message of TMGI_MONITORING_RESPONSE, the UE starts or restarts the T4104 timer. After the T4104 timer expires, if the UE is still interested in the MBMS service, the UE may retransmit the message of TMGI_MONITORING_RESPONSE, that is, re-requesting the relay device to forward the MBMS service.

From above, in 3GPP Rel-13, the forwarding of the MBMS service by the relay device is realized by the UE re-requesting the MBMS service periodically. If timing durations configured for T4104 and T4105 timers are short, it may cause the UE to frequently re-request the MBMS service. If timing durations configured for the T4104 and T4105 timers are too long, the relay device cannot stop forwarding the MBMS service in time. Both of the above two scenarios will lead to a waste of radio resources.

In embodiments of the present disclosure, whether to continue to forward a current MBMS service is determined based on feedback on a transmitted data packet from at least one UE, thereby effectively preventing the UE from frequently re-requesting the MBMS service and enabling the relay device to stop forwarding the MBMS service in time.

In order to clarify the objects, characteristics and advantages of the disclosure, embodiments of present disclosure will be described in detail in conjunction with accompanying drawings.

Figure 1:
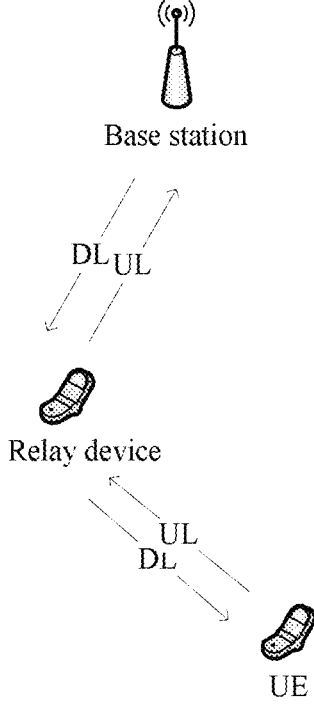
FIG. 1 is a structural diagram of a traditional relay in existing techniques.
Figure 2:
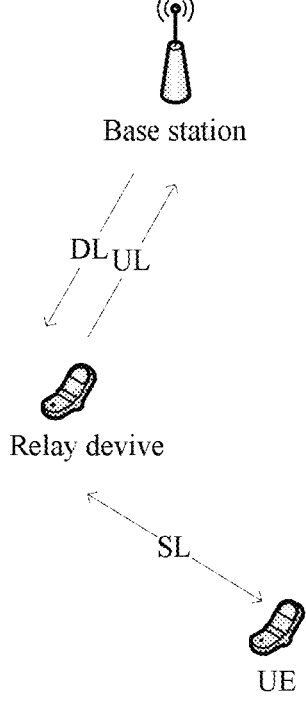
FIG. 2 is a structural diagram of a sidelink relay in the existing techniques.
Figure 3:
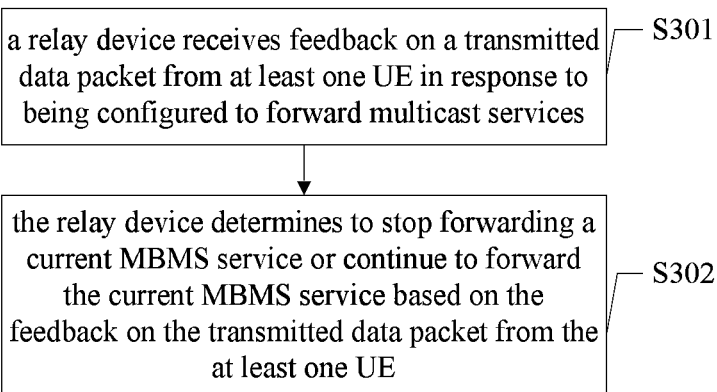
FIG. 3 is a flow chart of a service maintaining method in a sidelink relay system according to an embodiment.

In an embodiment, a service maintaining method in a sidelink relay system is provided. Referring to FIG. 3, details of the method are provided via specific steps below.

In some embodiments, the method including S301 and S302 may be performed by a chip (such as a baseband chip) with a data processing function in a relay device, or by a chip module containing a chip (such as a baseband chip) with a data processing function in the relay device.

In S301, a relay device receives feedback on a transmitted data packet from at least one UE in response to being configured to forward multicast service.

In some embodiments, a network side may configure the relay device and the UE, wherein the relay device is configured to forward multicast services in response to a request, and each UE is configured to feedback HARQ ACK or HARQ NACK based on decoding of a data packet transmitted each time.

In the embodiments of the present disclosure, the UE may feedback the feedback on the transmitted data packet on a Physical Sidelink Feedback Channel (PSFCH) resource, and the feedback of the UE may be HARQ ACK or HARQ NACK. The relay device receives the feedback from the UE on the PSFCH resource.

In S302, the relay device determines to stop forwarding a current MBMS service or continue to forward the current MBMS service based on the feedback on the transmitted data packet from the at least one UE.

In some embodiments, based on detecting that no UE feedback on the transmitted data packet has been received from any UE for N consecutive times, the relay device determines that UEs within a coverage of the relay device are not interested in the current MBMS service forwarded by the relay device. Therefore, the relay device determines to stop forwarding the current MBMS service. N may be 1, 2 or a greater integer value.

In some embodiments, the relay device may record a number of times of unsuccessfully receiving HARQ ACK/HARQ NACK. Based on failing to receive the HARQ ACK and HARQ NACK fed back by any UE for N consecutive times, the relay device may stop forwarding the current MBMS service without waiting for expiration of the T4105 timer.

In other words, in some embodiments, in response to failing to receive the HARQ ACK or HARQ NACK fed back by any one of the at least one UE for N consecutive times, the relay device may stop forwarding the current MBMS service in advance to improve utilization efficiency of radio resources.

In some embodiments, the relay device may record the number of failing to receive HARQ ACK. When the HARQ ACK fails to be received for N consecutive times, the relay device may stop forwarding the current MBMS service without waiting for expiration of the T4105 timer.

In other words, in some embodiments, in response to failing to receive the HARQ ACK for N consecutive times, the relay device may stop forwarding the current MBMS service in advance to improve utilization efficiency of radio resources.

In some embodiments, said the relay device failing to receive the HARQ ACK for N consecutive times includes the relay device detecting that at least one UE has transmitted feedback but the feedback on the transmitted data packet from the UE being HARQ NACK for N consecutive times. In this case, the relay device may determine that the UE is not interested in the current MBMS service forwarded by the relay device and determine to stop forwarding the current MBMS service. N may be 1, 2 or a greater integer value.

For example, there are four UEs within the coverage of the relay device, and N=2. The relay device records that all the four UEs feedback HARQ NACK on data packets transmitted at a first time, and records that all the four UEs feedback HARQ NACK on data packets transmitted at a second time. In this case, the relay device may determine to stop forwarding the current MBMS service.

In some embodiments, said the relay device failing to receive the HARQ ACK for N consecutive times includes the relay device failing to receive HARQ ACK/HARQ NACK for (N−M) times and receiving HARQ NACK for M times when transmitting data packets for N consecutive times. In this case, the relay device may determine that the UE is not interested in the forwarded MBMS service, and determine to stop forwarding the current MBMS service, where $0 \leq M \leq N$.

For example, there are two UEs within the coverage of the relay device. When transmitting data packets at a first time, the relay device does not receive HARQ ACK/HARQ NACK fed back by any UE. When transmitting data packets at a second time, the relay device receives HARQ NACK fed back by UE 1 and does not receive HARQ ACK/HARQ NACK fed back by UE 2, thus, the relay device determines that HARQ ACK fed back by the UEs fails to be received for two consecutive times. When transmitting data packets at a third time, the relay device receives HARQ NACK fed back by UE 1 and HARQ NACK fed back by UE 2, thus, the relay device determines that HARQ ACK fed back by the UEs fails to be received for three consecutive times.

That is, the relay device fails to receive HARQ ACK for N consecutive times, and N refers to a number of times of transmitting data packets. After each time of data packet transmission, the relay device may detect whether feedback is received from the UE, and whether the received feedback from the UE is HARQ ACK or HARQ NACK. Based on detecting that no UE feeds back HARQ ACK, the relay device may determine that no HARQ ACK has been successfully received for that time of data packet transmission. No UE feeding back HARQ ACK includes two situations, where one situation is that the at least one UE feeds back HARQ NACK, and the other situation is that the at least one UE does not feedback on that time of data packet transmission (that is, the at least one UE does not feedback HARQ NACK or HARQ ACK).

In some embodiments, based on detecting feedback on the transmitted data packet from any one of the at least one UE, no matter the feedback on the transmitted data packet is ACK or NACK, the relay device determines that the UE is interested in the current MBMS service. Therefore, the relay device may forward the current MBMS service and restart a T4105 timer.

In some embodiments, based on detecting feedback on the transmitted data packet from any one of the at least one UE, if the UE's feedback on the transmitted data packet is ACK, the relay device determines that the UE is interested in the current MBMS service interested. Therefore, the relay device may forward the current MBMS service and restart the T4105 timer.

From practical applications, the T4105 timer is a timer set in the relay device as specified in 3GPP standards. When transmitting a message of TMGI_MONITORING_RESPONSE, the relay device may start or restart the T4105 timer, and when the T4105 timer expires, the relay device stops forwarding the MBMS service.

From above, based on determining that the UE is interested in the current MBMS service, the relay device restarts the T4105 timer, thereby avoiding termination of the current MBMS service caused by timeout of the T4105 timer.

In other words, if the relay device detects that there is a UE interested in the current MBMS service during the forwarding of the MBMS service, the T4105 timer of the relay device will not time out until detecting that all of the at least one UE is not interested in the current MBMS service.

It can be seen from above that in the embodiments of the present disclosure, when it is determined whether to continue to forward the current MBMS service through the feedback of the transmitted data packet by the UE, it can effectively prevent the UE from frequently re-requesting the MBMS service and make the relay device timely Stop forwarding the MBMS service accordingly.

Figure 4:
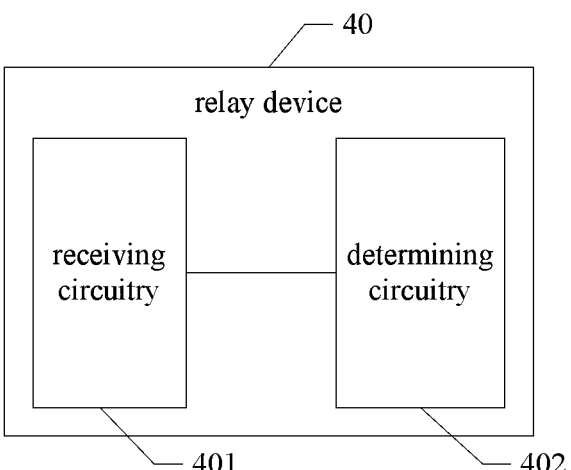
FIG. 4 is a structural diagram of a relay device according to an embodiment.

FIG. 4 is a structural diagram of a relay device 40 according to an embodiment. The relay device 40 includes a receiving circuitry 401 and a determining circuitry 402.

The receiving circuitry 401 is configured to receive feedback on a transmitted data packet from at least one UE in response to being configured to forward multicast services.

The determining circuitry 402 is configured to determine to stop forwarding a current MBMS service or continue to forward the current MBMS service based on the feedback on the transmitted data packet from the at least one UE.

In some embodiments, more details of the receiving circuitry 401 and the determining circuitry 402 may be referred to the above descriptions of S301 and S302 and are not repeated here.

In some embodiments, modules/units included in each apparatus and product described in the above embodiments may be software modules/units, hardware modules/units, or a combination of software modules/units and hardware modules/units.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a non-volatile or non-transitory computer-readable storage medium having computer instructions stored therein is provided, wherein when the computer instructions are executed by a processor, the service maintaining method in the sidelink relay system provided in any one of the above embodiments is performed.

In an embodiment of the present disclosure, a relay device which includes a memory, and a processor is provided, wherein the memory has computer instructions stored therein, and when the processor executes the computer instructions, the method for triggering the sidelink pre-emptive buffer status report provided in any one of the above embodiments is performed.

Those skilled in the art could understand that all or part of steps in the various methods in the above embodiments can be completed by instructing relevant hardware through a program, and the program can be stored in any computer-readable storage medium which includes a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A service maintaining method in a sidelink relay system, comprising:
   receiving feedback on a transmitted data packet from at least one User Equipment (UE) in response to being configured to forward multicast services; and
   determining to stop forwarding a current Multimedia Broadcast/Multicast Service (MBMS) service or continue to forward the current MBMS service based on the feedback on the transmitted data packet from the at least one UE;
   wherein said determining to stop forwarding the current MBMS service or continue to forward the current MBMS service based on the feedback on the transmitted data packet from the at least one UE comprises: determining to stop forwarding the current MBMS service based on detecting that a HARQ ACK fails to be received from the at least one UE for N consecutive times, wherein N≥1;
   wherein said determining to stop forwarding the current MBMS service based on detecting that a HARQ ACK fails to be received from the at least one UE for N consecutive times comprises: determining to stop forwarding the current MBMS service based on detecting that N consecutive times of feedback on the transmitted data packet from the at least one UE comprises M times of HARQ NACK and (N−M) times of unsuccessful feedback, wherein 0≤M≤N, and N≥1.

2. The method according to claim 1, wherein said receiving feedback on a transmitted data packet from at least one UE comprises:
   receiving the feedback on the transmitted data packet from the at least one UE on a physical sidelink feedback signal resource.

3. The method according to claim 1, wherein said determining to stop forwarding the current MBMS service or continue to forward the current MBMS service based on the feedback on the transmitted data packet from the at least one UE further comprises:
   determining to continue to forward the current MBMS service and restarting a timer based on detecting the feedback on the transmitted data packet from any one of the at least one UE, wherein the feedback on the transmitted data packet comprises ACK and NACK.

4. The method according to claim 1, wherein said determining to stop forwarding the current MBMS service or continue to forward the current MBMS service based on the feedback on the transmitted data packet from the at least one UE further comprises:

determining to continue to forward the current MBMS service and restarting a timer based on detecting that the feedback on the transmitted data packet from any one of the at least one UE is ACK.

5. A non-transitory computer readable storage medium storing one or more programs, the one or more programs comprising computer instructions, which, when executed by a processor, cause the processor to:

receive feedback on a transmitted data packet from at least one User Equipment (UE) in response to being configured to forward multicast services; and determine to stop forwarding a current Multimedia Broadcast/Multicast Service (MBMS) service or continue to forward the current MBMS service based on the feedback on the transmitted data packet from the at least one UE;

wherein the processor is further caused to: determine to stop forwarding the current MBMS service based on detecting that a HARQ ACK fails to be received from the at least one UE for N consecutive times, wherein N≥1;

wherein the processor is further caused to: determine to stop forwarding the current MBMS service based on detecting that N consecutive times of feedback on the transmitted data packet from the at least one UE comprises M times of HARQ NACK and (N−M) times of unsuccessful feedback, wherein 0≤M≤N, and N≥1.

6. A relay device comprising a memory and a processor, wherein the memory stores one or more programs, the one or more programs comprising computer instructions, which, when executed by the processor, cause the processor to:

receive feedback on a transmitted data packet from at least one User Equipment (UE) in response to being configured to forward multicast services; and determine to stop forwarding a current Multimedia Broadcast/Multicast Service (MBMS) service or continue to forward the current MBMS service based on the feedback on the transmitted data packet from the at least one UE;

wherein the processor is further caused to: determine to stop forwarding the current MBMS service based on detecting that a HARQ ACK fails to be received from the at least one UE for N consecutive times, wherein N≥1;

wherein the processor is further caused to: determine to stop forwarding the current MBMS service based on detecting that N consecutive times of feedback on the transmitted data packet from the at least one UE comprises M times of HARQ NACK and (N−M) times of unsuccessful feedback, wherein 0≤M≤N, and N≥1.

7. The relay device according to claim 6, wherein the processor is further caused to:

receive the feedback on the transmitted data packet from the at least one UE on a physical sidelink feedback signal resource.

8. The relay device according to claim 6, wherein the processor is further caused to:

determine to continue to forward the current MBMS service and restart a timer based on detecting the feedback on the transmitted data packet from any one of the at least one UE, wherein the feedback on the transmitted data packet comprises ACK and NACK.

9. The relay device according to claim 6, wherein the processor is further caused to:

determine to continue to forward the current MBMS service and restart a timer based on detecting that the feedback on the transmitted data packet from any one of the at least one UE is ACK.

* * * * *